(12) United States Patent
Swanson (10) Patent No.: US 7,631,741 B2
(45) Date of Patent: Dec. 15, 2009

(54) ENGINE CLUTCH ACTUATOR (75) Inventor: Michael J. Swanson, Tulsa, OK (US)

(73) Assignee: Arrow Engine Company, Tulsa, OK (US)

( * ) Notice: Subject to any disclaimer, the term of this patent is extended or adjusted under 35 U.S.C. 154(b) by 404 days.

(21) Appl. No.: 11/636,883

(22) Filed: Dec. 11, 2006

(65) Prior Publication Data
US 2008/0135372 A1 Jun. 12, 2008

(51) Int. Cl.
F16D 19/00 (2006.01)
F16D 21/00 (2006.01)
F16D 23/00 (2006.01)

(52) U.S. Cl. ................................................... 192/99 R
(58) Field of Classification Search ................. 192/99 S, 192/99 R; 74/512
See application file for complete search history.

(56) References Cited

U.S. PATENT DOCUMENTS

| 3,069,164 | A | * | 12/1962 | Kohlberg | 473/73 |
| 3,311,065 | A | * | 3/1967 | Hager | 74/41 |
| 4,114,743 | A | | 9/1978 | Sink et al. | 192/91 R |
| 4,154,119 | A | | 5/1979 | Chapman | 74/47 |
| 4,257,506 | A | | 3/1981 | Bankstahl | 192/21 |
| 4,351,405 | A | * | 9/1982 | Fields et al. | 180/65.225 |
| 4,717,002 | A | | 1/1988 | Sasamura | 192/99 |
| 4,846,012 | A | | 7/1989 | Papenhagen et al. | 74/512 |
| 6,719,116 | B2 | | 4/2004 | Bender et al. | 192/85 |
| 6,930,271 | B1 | * | 8/2005 | Palmieri et al. | 218/154 |
| 2004/0156703 | A1 | * | 8/2004 | Benedikt | 414/498 |

* cited by examiner

Primary Examiner—Tisha D Lewis
(74) Attorney, Agent, or Firm—Woodard, Emhardt, Moriarty, McNett & Henry LLP (57) ABSTRACT An actuator linkage for imparting a rotating motion to a clutch operating shaft according to one embodiment of the present invention comprises a linear actuator including an extendable and retractable arm, the arm including a pivot end, a linkage bar having a first pivot location and an oppositely-disposed second pivot location, a slotted linkage bar having a first pivot location and an oppositely-disposed second pivot location having the shape of a slot, a control link having a first end constructed and arranged to connect to the control shaft and a second end defining a pivot location, wherein the pivot end of the extendable and retractable arm, the first pivot location of the linkage bar, and the first pivot location of the slotted linkage are pivotally connected together, and the control link being constructed and arranged to move from a first slack position through a clutch operating shaft over-center position to a second slack position with movement of the extendable and retractable arm.

19 Claims, 5 Drawing Sheets

ENGINE CLUTCH ACTUATOR

BACKGROUND OF THE INVENTION

The present invention relates in general to clutch actuators that are used to engage and disengage a clutch that is associated with an engine. More specifically, the present invention relates to a clutch actuator linkage that is used in cooperation with a clutch that is operably connected to an engine. The clutch includes a clutch operating shaft that cooperates with the clutch actuator linkage so as to transition the clutch from a disengaged condition to an engaged condition and then return from an engaged condition to a disengaged condition.

In a broad, conceptual sense, clutches are considered to be well known mechanisms. While the engaging and disengaging configurations or mechanisms can assume a variety of forms and constructions, clutches (generally) are constructed and arranged for use in conjunction with two rotating shafts such as a motor vehicle engine and its manual transmission. Clutches are also found in other devices, such as cordless drills and chain saws, as only a couple of other examples.

A typical clutch configuration connects the two shafts so that they can either be locked together and rotate at the same speed or de-coupled and rotate at different speeds. In a motor vehicle, depressing the clutch pedal disengages the clutch from the engine. In other clutch designs, the engaging and disengaging mechanism and method may be different. For example, a clutch may be engaged and disengaged by the use of a hand lever connected to one end of an operating shaft. Turning or rotating the clutch operating shaft about its longitudinal axis turns a throw out yoke for the desired engagement with other portions of the clutch structure. A representative example of such a construction is offered by Arrow Engine Company of Tulsa, Okla. by its clutch model No. C-110-HP-3. This type of clutch actuator would be compatible for engaging a clutch on any engine utilizing a power take off (PTO) type clutch where it is necessary to use linear motion to engage or disengage a clutch mechanism. A good example of this application would be the C-Series engine also offered by Arrow Engine Company. These gas engines are constructed and arranged for continuous duty use in oil fields for powering a pump jack, as one example. Since these types of engines and clutches do not lend themselves to incorporation of a clutch pedal, the referenced hand lever has been provided. However, use of the hand lever requires a human presence and considering the size and location of the clutch and engine, an automated linkage to actuate the clutch (i.e., engage and disengage) is seen as an improvement.

One type of automated device for a clutch linkage is offered by F.W. Murphy (United Kingdom) with its U.S. facility in Tulsa, Okla., as model No. CO3. The CO3 product is described as an "electric motor driven clutch operator for engine automation systems". This electronic controlled and driven design requires various component controls such as limit switches, or the like, in order to control the travel of linkage and/or clutch components.

The disclosed structure, as presented herein, approaches the automated actuator design in a manner that is different from the F.W. Murphy CO3. The structure disclosed herein uses a linear actuator and a unique linkage to turn the clutch operating shaft. By taking advantage of the over-center clutch design in terms of its operating shaft, the disclosed structure is able to substantially eliminate any noticeable clutch pre-load that might otherwise be applied to the clutch operating shaft according to various prior art designs. Importantly, the clutch that is associated with the disclosed clutch linkage, as described herein, has a structural configuration that incorporates an over-center position between the clutch-disengaged position and the clutch-engaged position. The force requirements to rotate or turn the clutch operating shaft increase as the clutch operating shaft approaches that over-center position. When the clutch operating shaft snaps or pops through this over-center position, the clutch is engaged and no further force is required to maintain the clutch-engaged position by means of the clutch operating shaft and the disclosed actuator linkage.

BRIEF SUMMARY

An actuator linkage for imparting a rotating motion to a control shaft according to one embodiment of the present invention comprises a linear actuator including an extendable and retractable arm, the arm including a pivot end, a linkage bar having a first pivot location and an oppositely-disposed second pivot location, a slotted linkage bar having a first pivot location and an oppositely-disposed second pivot location having the shape of a slot, a control link having a first end constructed and arranged to connect to the control shaft and a second end defining a pivot location, wherein the pivot end of the extendable and retractable arm, the first pivot location of the linkage bar, and the first pivot location of the slotted linkage bar are pivotally connected together, and the control link being constructed and arranged to move from a first slack position through a control shaft over-center position to a second slack position with movement of the extendable and retractable arm.

One object of the present disclosure is to describe an improved actuator linkage.

DETAILED DESCRIPTION

For the purposes of promoting an understanding of the disclosure, reference will now be made to the embodiments illustrated in the drawings and specific language will be used to describe the same. It will nevertheless be understood that no limitation of the scope of the disclosure is thereby intended, such alterations and further modifications in the illustrated device and its use, and such further applications of the principles of the disclosure as illustrated therein being contemplated as would normally occur to one skilled in the art to which the disclosure relates.

Referring to FIGS. 1-4, there is illustrated the assembled combination of an engine 20, clutch 21, clutch operating shaft 22, and clutch actuator assembly 23 that is constructed and arranged according to the disclosed embodiment of the present invention. As is well known in the art, the clutch 21 is operably coupled to the engine 20 and the clutch 21 is engaged and disengaged by turning or rotation of a control shaft, described herein as a clutch operating shaft 22. The direction of turning or rotation is about the longitudinal axis of the shaft 22. The focus of the present disclosure is on clutch actuator assembly 23 and its included linkage. Further, while clutch actuator assembly 23 is disclosed in combination with a clutch 21 and engine 20, the actuator assembly has broader applicability and can be used for other types of mechanisms or devices where turning or rotation of a control shaft or similar structure is desired. Preferably, these other or alternative uses for similar or related structures also include the use of an over-center position so as to result in a slack condition for the linkage and thereby eliminate any clutch (or other device) pre-load as being applied at or on the clutch operating shaft when the clutch is either fully engaged or fully disengaged. As used herein, "slack condition" refers to the linkage slot and the pin being generally centered in the slot. The representation of clutch actuator assembly 23 in the context environment of the illustrated engine 20 and clutch 21 combination is considered to be the preferred embodiment and best mode, as far as the overall assembly. However, it is not intended that the scope of this disclosure nor the use of actuator assembly 23 be limited to what is specifically illustrated. It is also important to understand that clutch 21, as briefly described in the Background, includes an over-center or cross-over construction causing the clutch operating shaft to pop past the over-center location into a no-load or no-force status.

Figure 1:
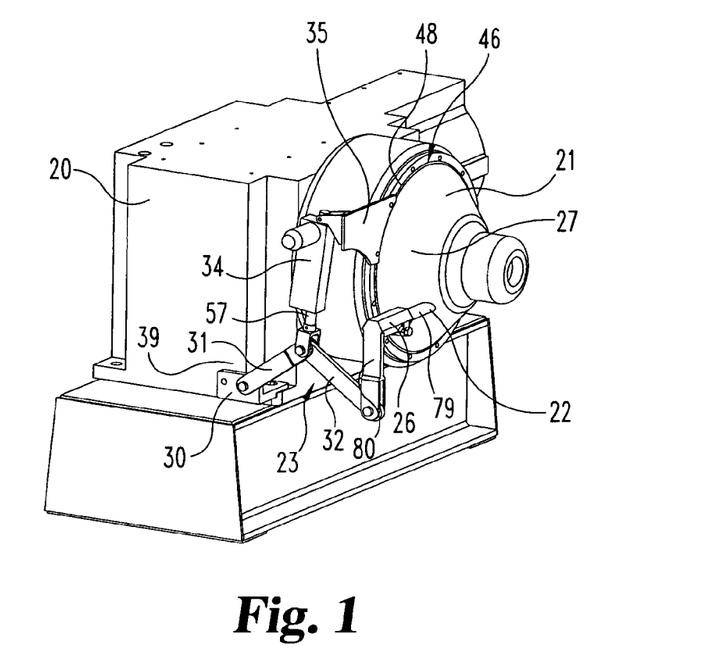
FIG. 1 is a perspective view of an actuator linkage in combination with a clutch and engine according to a typical embodiment.
Figure 2:
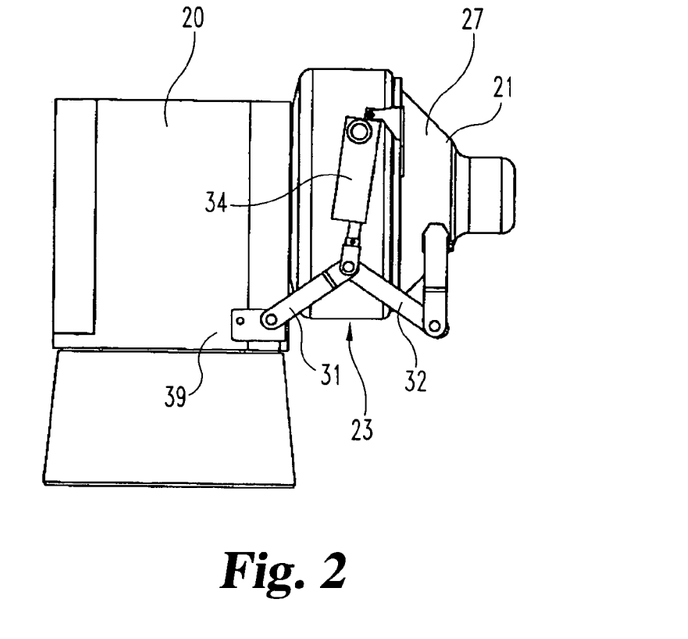
FIG. 2 is a side elevational view of the FIG. 1 combination.
Figure 3:
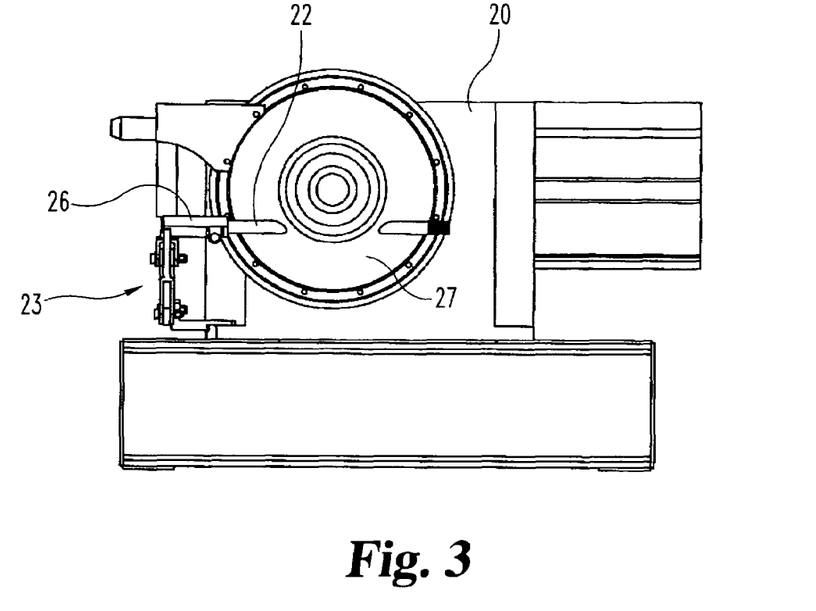
FIG. 3 is a rear elevational view of the FIG. 1 combination.
Figure 4:
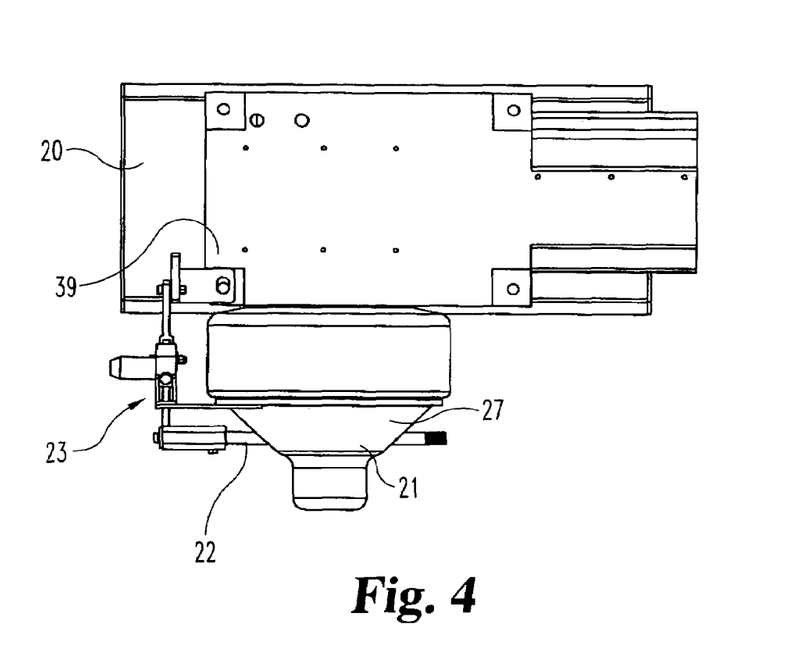
FIG. 4 is a top plan view of the FIG. 1 combination.

With continued reference to FIGS. 1-4, clutch 21 is constructed and arranged in a generally conventional manner incorporating a drive ring, series of plates, and a clutch shaft, among other component parts. A representative clutch is a model No. C-110-HP-3 offered by Arrow Engine Company of Tulsa, Okla. Although separately identified and numbered, clutch operating shaft 22 is a part of clutch 21. Shaft 22 is splined and is received within the cooperating and compatible splined linkage bar 26. As can be seen in FIGS. 3 and 4, shaft 22 extends through the clutch housing 27.

The turning or rotation of clutch operating shaft 22 about its longitudinal axis, in a counterclockwise direction, based upon the side elevational view and orientation of FIG. 2, is required in order to engage the clutch, beginning from a clutch-disengaged condition. As has been described, the clutch 21 and its associated components operate with an over-center construction. This means that when turning the clutch operating shaft 22 for clutch 21 engagement, the force required increases as the over-center location or condition is approached. When the clutch operating shaft 22 travels through the over-center position, the clutch is engaged and the clutch operating shaft 22 exhibits a continuously reduced input force as it crosses through this cross-over point and then the clutch actuator assembly 23 generally assumes a slack condition such that no continuing force is required to be applied to the clutch operating shaft in order to maintain clutch engagement. This can also be described as having eliminated any clutch pre-load that would be applied at the clutch operating shaft when the clutch is fully engaged (or fully disengaged).

In the reverse direction, moving from the clutch-engaged condition to the clutch-disengaged condition, the clutch operating shaft is turned in a clockwise direction, based upon the FIG. 2 orientation. During this return path for the clutch operating shaft, the over-center position or location is once again encountered. The force required for the clutch operating shaft to rotate through that over-center position increases as the over-center position is approached and is at a maximum at the over-center position. As the over-center position is passed, the clutch operating shaft pops free as no input force is required for the clutch operating shaft and causes the dependent movement of the splined linkage bar 26 in a clockwise direction, based on the FIG. 2 orientation.

Figure 5:
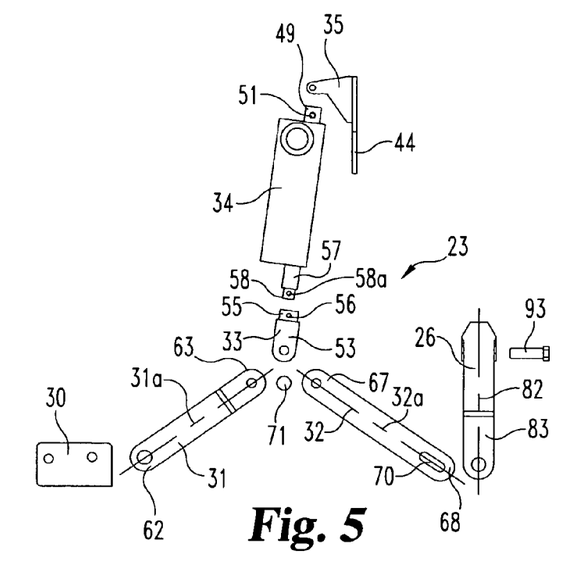
FIG. 5 is an exploded, side elevational view, of the FIG. 1 actuator linkage.
Figure 6:
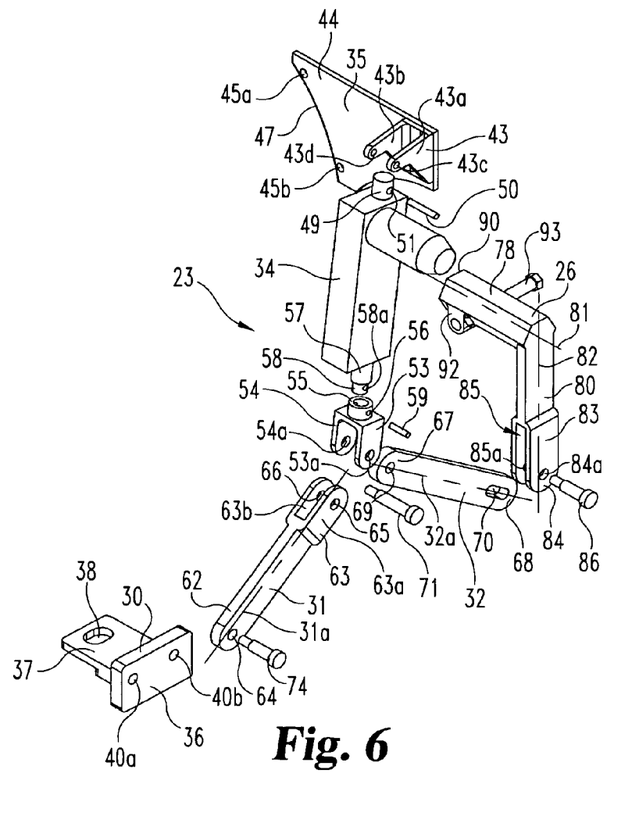
FIG. 6 is an exploded, perspective view, of the FIG. 1 actuator linkage.

Referring now to FIGS. 5 and 6, exploded views of clutch actuator assembly 23 are illustrated. Clutch actuator assembly 23 includes an engine case bracket 30, linkage bar 31, slotted linkage bar 32, clevis bracket 33, linear actuator 34, clutch housing bracket 35, splined linkage bar 26, and an assortment of pins in order to connect the linkage members together. The referenced "pins" can be shouldered bolts or rivets as well as headed pins, shafts, or any other material acting to mechanically connect a rotating joint. Case bracket 30 includes a pivot plate 36 jointed to a mounting plate 37. The mounting plate includes a clearance opening 38 for use in bolting the bracket 30 to the engine case 39. The two pivot pin holes 40a and 40b are defined by plate 36. While only one pivot pin hole is used for any one engine/clutch combination, providing more than one hole gives added versatility to the assembly installation as different engine/clutch combinations can be accommodated. In the illustrated embodiment, the closer pivot pin hole 40b is used for the connection of linkage bar 31.

Clutch housing bracket 35 is constructed and arranged for attachment to clutch housing 27 by the use of threaded fasteners, preferably capscrews. Bracket 35 includes a clevis support 43 and a mounting plate 44. The mounting plate 44 defines two clearance holes 45a and 45b. These two clearance holes are sized and spaced to fit into the bolt circle 46 of the clutch housing 27, see FIG. 1. Plate 44 also has an arcuate edge 47 to fit and conform to circular edge 48 of the clutch housing 27. Upper cylindrical post 49 of linear actuator 34 fits between the flanges 43a and 43b of the clevis support 43 and a pivot pin 50 extends through each flange hole 43c and 43d and through pivot hole 51 in post 49. Hole 51 is a single, radial through-hole passing through post 49 on a diameter.

Actuator clevis bracket 33 includes a pair of spaced flanges 53 and 54 and a hollow cylindrical post 55 with two axial aligned holes through (on a diameter) with a pivot pin hole 56. The clevis flanges 53 and 54 each define a corresponding pivot pin hole 53a and 54a, respectively. Holes 53a and 54a are axially aligned with each other. Linear actuator 34 includes an extendable and retractable actuator arm 57 that is shouldered between larger and smaller diameter portions. The smaller diameter portion 58 includes a single, radial through hole 58a. Portion 58 fits closely within the hollow interior of post 55 and hole 58a is aligned with pivot pin hole 56, upon engagement. Pivot pin 59 is inserted through holes 58a and 56.

Linkage bar 31 includes a flat, single thickness end 62 and opposite thereto a clevis end 63 with spaced-apart clevis end flanges 63a and 63b. End 62 defines a pivot pin hole 64 and each flange 63a and 63b defines a pivot pin hole 65 and 66, respectively. Holes 65 and 66 are axially aligned with each other. Holes 64, 65, and 66 are all located (i.e., centered) on the longitudinal centerline 31a of linkage bar 31.

Slotted linkage bar 32 includes a pivot hole end 67 and a slotted end 68. The center of pivot pin hole 69 and the centerline of slot 70 are located (i.e., centered) on the longitudinal centerline 32a of slotted linkage bar 32. End 67 is sized and arranged to fit closely between clevis flanges 63a and 63b. Clevis end 63 is sized and arranged to fit closely between clevis flanges 53 and 54. Once the pivot pin holes 53a and 54a are axially aligned with pivot pin holes 65 and 66, and with pivot pin hole 69, pin 71 is inserted in order to create a pivot joint for the assembled linkage. End 62 of linkage bar 31 is pinned to case bracket 30 using pin 74 inserted through hole 64 into either pivot pin hole 40a or pivot pin hole 40b, depending on the installation arrangement.

The splined linkage bar 26 includes a splined, hollow tube portion 78 that is constructed and arranged to engage end 79 of clutch operating shaft 22. A right angled clevis link 80 is included in unitary construction with portion 78. Portion 78 has an axial centerline 81 that is substantially perpendicular to the longitudinal centerline 82 of link 80. The free end 83 of link 80 includes spaced-apart clevis flanges 84 and 85, each flange defining a corresponding pivot pin hole 84a and 85a, respectively. Holes 84a and 85a are axially aligned with each other and are located on longitudinal centerline 82. Slotted end 68 of linkage bar 32 fits closely between flanges 84 and 85 and is pinned in that position by pivot pin 86. The open end 90 of tube portion 78 is splined (female) and the free end 79 of shaft 22 is correspondingly splined (male). Clamping flange portion 92 and capscrew 93 are constructed and arranged for clamping open end 90 tightly around the free end 79 of shaft 22.

Figure 7:
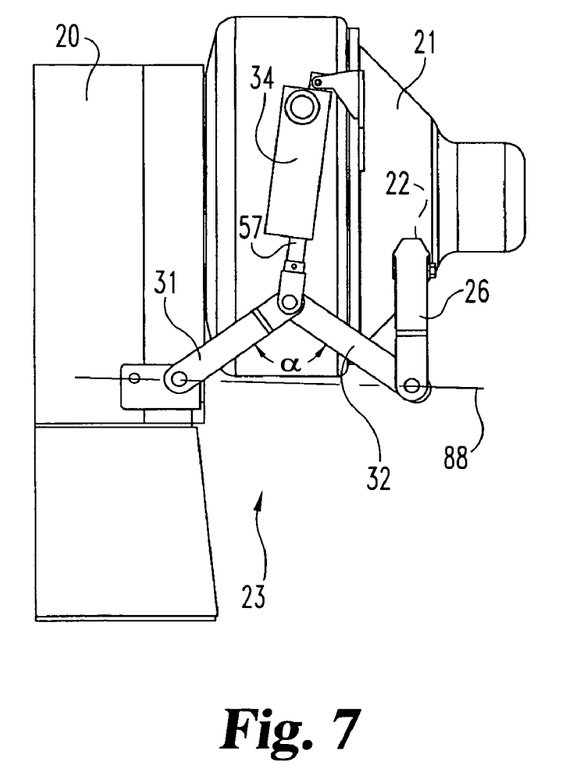
FIG. 7 is a side elevational view of the FIG. 1 combination with the clutch and actuator linkage in a disengaged position.
Figure 7A:
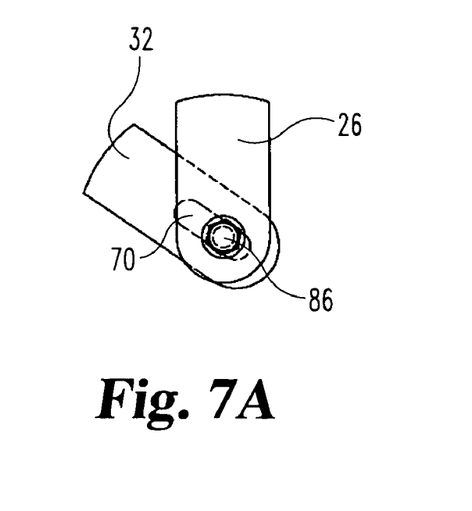
FIG. 7A is a diagrammatic illustration of a pivot pin placement relative to a slot of the FIG. 1 actuator linkage.
Figure 8:
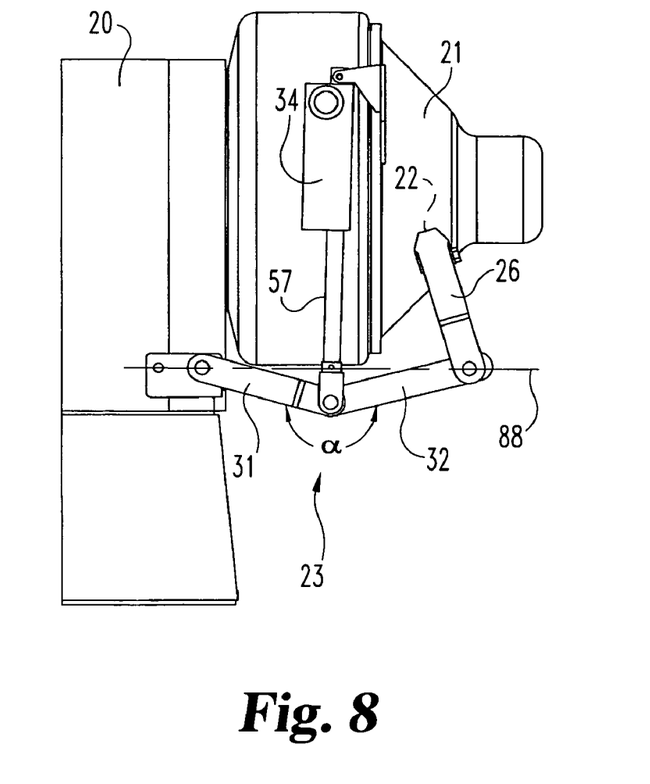
FIG. 8 is a side elevational view of the FIG. 1 combination with the clutch and actuator linkage in an engaged position.

Referring to FIGS. 7 and 8, the assembled combination of engine 20, clutch 21, clutch operating shaft 22, and clutch actuator assembly 23 is illustrated in the clutch disengaged condition (FIG. 7) and in the clutch engaged condition (FIG. 8). In terms of the operation of clutch actuator assembly 23, we begin with the linear actuator 34 in a retracted, disengaged condition as illustrated in FIG. 7. In this condition, pivot pin 86 is positioned approximately in the mid-range of slot 70 between the closed ends (see FIG. 7A). This is also described as a slack position of the slotted linkage bar 32. Upon extension of arm 57 of the linear actuator 34, the joint formed by the actuator clevis bracket 33, the unslotted linkage bar 31, and the slotted linkage bar 32 begins to move in a downward direction based upon the FIG. 7 orientation with line 88 representing a generally horizontal plane. This manner of movement increases the magnitude of the included angle ($\alpha$) between linkage bars 31 and 32. It will be noted that these two linkage bars are pivotally connected to each other and in the starting position (disengaged condition), these two linkage bars define an included angle ($\alpha$) which is (initially) less than 180°. As the actuator arm 57 extends in a downward direction, this translates into movement of linkage bars 31 and 32 and this in turn translates into rotational movement of splined linkage bar 26. Splined linkage bar 26 functions as a moment arm, providing rotation to the splined clutch operating shaft 22. As the clutch operating shaft rotates and approaches the clutch over-center position, the required linkage force gradually increases. When the over-center position is reached, the linkage arrangement is also at its maximum required force level in order to pop the clutch operating shaft through that over-center position. Just as the clutch operating shaft pops past the over-center position, the clutch is engaged. Once the clutch operating shaft pops through the over-center position to the counterclockwise side of that position, no further force is required in order to maintain the clutch-engaged condition. Even though the clutch is engaged at this point, an event that generally coincides with a linear relationship between linkage bars 31 and 32 (included angle ($\alpha$)=180°), the linear actuator continues to extend arm 57. As this continuing travel occurs, it causes the two linkage bars 31 and 32 to move off of their substantially co-linear alignment and causes the included angle ($\alpha$) to become greater than 180°. The pivot pin 86 gradually moves toward the center of slot 70 and the linkage assembly 23 assumes the "slack position". When the linear actuator arm 57 reaches its designed, fully extended position, the linear actuator is de-energized by the use of internal limit switches (not shown). The clutch 21 is fully engaged without any pre-load from the linkage assembly 23 and remains until the linear actuator receives a control input.

Figure 8A:
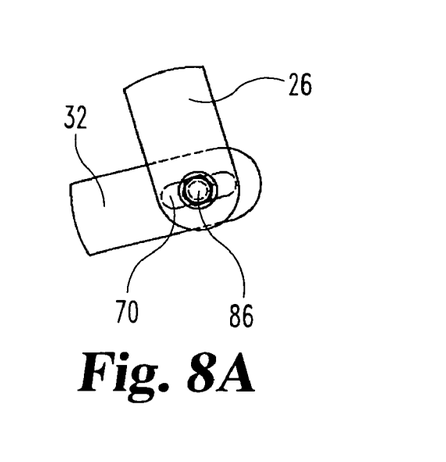
FIG. 8A is a diagrammatic illustration of the pivot pin placement in the slot.

In the disengaged position, pin 86 is located in the mid-range of slot 70 (see FIG. 7A) and this is described as a "slack" position. Then, as the arm 57 of linear actuator 34 is extended, pin 86 begins to move (slide) toward the inner closed end of slot 70. When the travel of pin 86 stops or bottoms out at the left end of the slot 70, continued movement of arm 57 results in the described turning or rotation of the splined clutch operating shaft 22. When the arm 57 pushes linkage bars 31 and 32 past their co-linear position, the slotted linkage bar 32 is pulled away from the splined linkage bar 26. This draws pin 86 into the approximate center of slot 70 (see FIG. 8A). While this linkage movement is occurring, the clutch operating shaft has reached the over-center location and has been forced through that location, popping to the other side and causing the engagement of the clutch. This is also a no-load condition since no continuing or constant force is required to maintain the clutch engaged condition. When the pin 86 is generally in the center of slot 70 between its closed ends, the clutch is engaged and the linkage is in a slack condition. As a result, the clutch is engaged without input force or pre-load on the clutch operating shaft. This design configuration extends the life of the clutch, the linkage, the actuator, and shaft construction used to engage the clutch.

When the clutch actuator assembly 23 is moved from the clutch-engaged position of FIG. 8 back to the clutch-disengaged position of FIG. 7, generally speaking the reverse sequence of those steps just described will occur. This begins with retracting arm 57 of the linear actuator 34. As the arm 57 retracts, the linkage bars 31 and 32 move from an included angle ($\alpha$) of greater than 180° to the 180° engaged point where pin 86 is at the left end of slot 70 and then on to an included angle ($\alpha$) that is less than 180° where pin 86 once again moves toward the center of slot 70. As this movement occurs, pin 86 slides in slot 70 from the described slack condition with the pin 86 midway in slot 70 to the left and then reverses to the right end of the slot. Once the pin 86 bottoms out at the right end of slot 70, the continued retraction of arm 57 causes the clockwise rotation of splined linkage bar 26 and this rotates the clutch operating shaft 22 toward the over-center location. As the over-center location is approached, the force requirement increases. When the clutch operating shaft pops past the over-center location, it jumps, causing the splined linkage bar 26 to pivot toward a vertical position based on the FIG. 2 orientation and positioning pin 86 in slot 70 between the closed ends of slot 70. As the actuator 34 retracts arm 57, pin 86 moves toward the approximate center of slot 70 (i.e., the slack position). This slack position generally corresponds to the disengaged condition of FIG. 7. While there is some continued movement is fully retracted, the pin 86 stays generally in the slack position and is not bottomed out on the right end of slot 70.

Configuring actuator assembly 23 in the manner described enables the engine clutch to be engaged and disengaged while eliminating any clutch pre-load applied to the clutch operating shaft when the clutch is fully engaged and when it is fully disengaged. This operation corresponds to the referenced "slack" positions of the linkage associated with the actuator assembly 23.

While the preferred embodiment of the invention has been illustrated and described in the drawings and foregoing description, the same is to be considered as illustrative and not restrictive in character, it being understood that all changes and modifications that come within the spirit of the invention are desired to be protected.

The invention claimed is:

1. An actuator linkage for imparting a rotating motion to a control shaft, said actuator linkage comprising:
    a linear actuator including an extendable and retractable arm, said arm including a pivotal end;
    a linkage bar having a longitudinal centerline, a first pivot location generally centered on the longitudinal centerline of said linkage bar and an oppositely-disposed second pivot location generally centered on the longitudinal centerline of said linkage bar;
    a slotted linkage bar having a longitudinal centerline, a first pivot location generally centered on the longitudinal centerline of said slotted linkage bar and an oppositely-disposed second pivot location having the shape of a slot generally centered on the longitudinal centerline of said slotted linkage bar;
    a control link having a first end constructed and arranged to connect to said control shaft and a second end defining a pivot location;
    wherein the pivot end of said extendable and retractable arm, the first pivot location of the linkage bar, and the first pivot location of the slotted linkage are all pivotally connected together;
    wherein the second end of said control link and the second pivot location of said slotted linkage bar are pivotally connected together; and
    said control link being constructed and arranged to move from a first slack position through a control shaft over-center position to a second slack position with movement of said extendable and retractable arm.

2. The actuator linkage of claim 1 wherein said control shaft is part of a clutch that cooperates with an engine.

3. The actuator linkage of claim 2 wherein said linear actuator being connected to a clutch housing.

4. The actuator linkage of claim 3 wherein said first end of said control link having an axial centerline and said second end of said control link having a longitudinal centerline that is substantially perpendicular to said axial centerline.

5. The actuator linkage of claim 2 wherein said first pivot location of said linkage bar is adjacent said engine.

6. The actuator linkage of claim 2 wherein said clutch is changed from a disengaged condition to an engaged condition by movement of said actuator linkage, the longitudinal centerline of said linkage bar and the longitudinal centerline of said slotted linkage bar being constructed and arranged to define an included angle of less than 180° when said clutch is in said disengaged condition.

7. The actuator linkage of claim 6 wherein said included angle being approximately 180° when said actuator linkage has turned said control shaft sufficiently for engagement of said clutch.

8. The actuator linkage of claim 1 wherein said slotted linkage bar is pivotally connected to said control link by a pivot pin that is constructed and arranged to travel within said slot.

9. The actuator linkage of claim 8 wherein said slot having oppositely-disposed closed ends and said pivot pin being spaced apart from said closed ends when in either slack position.

10. In combination:
    an engine constructed and arranged to create rotary motion;
    a clutch constructed and arranged to cooperate with said engine, said clutch including a clutch operating shaft and having an over-center position between clutch-disengaged and clutch-engaged positions; and
    an actuator linkage connected to said clutch operating shaft for rotating said clutch operating shaft for changing the disengaged/engaged status of the clutch, said actuator linkage comprising:
        a linear actuator including an extendable and retractable arm, said arm including a pivotal end;
        a linkage bar having a first pivot location and an oppositely-disposed second pivot location which is pivotally connected to said engine;
        a slotted linkage bar having a first pivot location and an oppositely-disposed second pivot location having the shape of a slot;
        a control link having a first end constructed and arranged to connect to said control shaft and a second end defining a pivot location;
        wherein the pivot end of said extendable and retractable arm, the first pivot location of the linkage bar and the first pivot location of the slotted linkage are all pivotally connected together;
        wherein the second end of said control link and the second pivot location of said slotted linkage bar are pivotally connected together; and
        said control link being constructed and arranged to move from a first slack position through said control shaft over-center position to a second slack position with movement of said extendable and retractable arm.

11. The combination of claim 10 wherein said linear actuator being connected to a clutch housing.

12. The combination of claim 11 wherein said first end of said control link having an axial centerline and said second end of said control link having a longitudinal centerline that is substantially perpendicular to said axial centerline.

13. The combination of claim 10 wherein said clutch is changed from a disengaged condition to an engaged condition by movement of said actuator linkage, said linkage bar and said slotted linkage bar being constructed and arranged to define an included angle of less than 180° when said clutch is in said disengaged condition.

14. The combination of claim 13 wherein said included angle being approximately 180° when said actuator linkage has turned said control shaft sufficiently for engagement of said clutch.

15. The combination of claim 10 wherein said slotted linkage bar is pivotally connected to said control link by a pivot pin that is constructed and arranged to travel within said slot.

16. The combination of claim 15 wherein said slot having oppositely-disposed closed ends and said pivot pin being spaced apart from said closed ends when in either slack position.

17. An actuator linkage for imparting a rotating motion to a control shaft, wherein said control shaft is part of a clutch that cooperates with an engine, said actuator linkage comprising:
    a linear actuator including an extendable and retractable arm, said arm including a pivotal end;
    a linkage bar having a first pivot location and an oppositely-disposed second pivot location;
    a slotted linkage bar having a first pivot location and an oppositely-disposed second pivot location having the shape of a slot;
    a control link having a first end constructed and arranged to connect to said control shaft and a second end defining a pivot location;

wherein the pivot end of said extendable and retractable arm, the first pivot location of the linkage bar, and the first pivot location of the slotted linkage are all pivotally connected together;

wherein the second end of said control link and the second pivot location of said slotted linkage bar are pivotally connected together;

said control link being constructed and arranged to move from a first slack position through a control shaft over-center position to a second slack position with movement of said extendable and retractable arm; and wherein said clutch is changed from a disengaged condition to an engaged condition by movement of said actuator linkage, said linkage bar and said slotted linkage bar being constructed and arranged to define an included angle of less than 180° when said clutch is in said disengaged condition, wherein said included angle being approximately 180° when said actuator linkage has turned said control shaft sufficiently for engagement of said clutch.

18. An actuator linkage for imparting a rotating motion to a control shaft, said actuator linkage comprising:

a linear actuator including an extendable and retractable arm, said arm including a pivotal end;

a linkage bar having a first pivot location and an oppositely-disposed second pivot location;

a slotted linkage bar having a first pivot location and an oppositely-disposed second pivot location having the shape of a slot;

a control link having a first end constructed and arranged to connect to said control shaft and a second end defining a pivot location;

wherein the pivot end of said extendable and retractable arm, the first pivot location of the linkage bar, and the first pivot location of the slotted linkage are all pivotally connected together;

wherein the second end of said control link and the second pivot location of said slotted linkage bar are pivotally connected together;

said control link being constructed and arranged to move from a first slack position through a control shaft over-center position to a second slack position with movement of said extendable and retractable arm; and wherein said slotted linkage bar is pivotally connected to said control link by a pivot pin that is constructed and arranged to travel within said slot, wherein said slot having oppositely-disposed closed ends and said pivot pin being spaced apart from said closed ends when in either slack position.

19. An actuator linkage for imparting a rotating motion to a control shaft, said actuator linkage comprising:

a linear actuator including an extendable and retractable arm, said arm including a pivotal end;

a linkage bar having a first pivot location and an oppositely-disposed second pivot location;

a slotted linkage bar having a first pivot location and an oppositely-disposed second pivot location having the shape of a slot;

a control link having a first end constructed and arranged to connect to said control shaft and a second end defining a pivot location;

wherein the pivot end of said extendable and retractable arm, the first pivot location of the linkage bar, and the first pivot location of the slotted linkage are all pivotally connected together;

wherein the second end of said control link and the second pivot location of said slotted linkage bar are pivotally connected together;

wherein said second pivot location of said slotted linkage bar is movable relative to the second pivot location of said linkage bar by movement of said extendable and retractable arm; and said control link being constructed and arranged to move from a first slack position through a control shaft over-center position to a second slack position with movement of said extendable and retractable arm.

* * * * *